(12) United States Patent
Fechtel

(10) Patent No.: US 9,584,351 B2
(45) Date of Patent: Feb. 28, 2017

(54) SYMBOL CONSTELLATION DESIGN

(71) Applicant: Intel Corporation, Santa Clara, CA (US)

(72) Inventor: Stefan Fechtel, Zorneding (DE)

(73) Assignee: Intel Corporation, Santa Clara, CA (US)

(*) Notice: Subject to any disclaimer, the term of this patent is extended or adjusted under 35 U.S.C. 154(b) by 99 days.

(21) Appl. No.: 14/573,994

(22) Filed: Dec. 17, 2014

(65) Prior Publication Data

US 2016/0182267 A1 Jun. 23, 2016

(51) Int. Cl.
*H04W 4/00* (2009.01)
*H04L 27/26* (2006.01)

(52) U.S. Cl.
CPC ...... *H04L 27/2602* (2013.01); *H04L 27/2605* (2013.01); *H04L 27/2646* (2013.01)

(58) Field of Classification Search
CPC ............. H04L 27/2602; H04L 27/2605; H04L 27/2646
See application file for complete search history.

(56) References Cited

U.S. PATENT DOCUMENTS

| 6,324,382 B1* | 11/2001 | Dolder | ................... | H04B 7/005 375/340 |
| 2005/0174933 A1* | 8/2005 | Sakoda | ............... | H04L 27/2601 370/208 |
| 2014/0140194 A1 | 5/2014 | Fechtel | | |
| 2014/0355626 A1 | 12/2014 | Fechtel | | |
| 2015/0103944 A1* | 4/2015 | Shitomi | ............. | H04L 27/2627 375/295 |

FOREIGN PATENT DOCUMENTS

EP 2566121 A1 3/2013

OTHER PUBLICATIONS

Huemer et al, "Non-Systematic Complex Number RS Coded OFDM by Unique Word Prefix," IEEE Transactions on Signal Processing, vol. 60, No. 1, Jan. 2012, 15 pages.
Huemer et al., "The Potential of Unique Words in OFDM," in Proc, 15th International OFDM Workshop 2010, Sep. 2010, Hamburg, Germany, 5 pages.
International Search Report and Written Opinion mailed on Apr. 28, 2016 for International Application No. PCT/US2015/061160; 10 pages.

* cited by examiner

*Primary Examiner* — Phuc Tran
(74) *Attorney, Agent, or Firm* — Schwabe, Williamson & Wyatt, P.C.

(57) ABSTRACT

In embodiments, apparatuses, methods, and storage media may be described for removing, from a frequency domain (FD) portion of a signal, a guard interval portion. One or more data symbols of the resultant unconstrained FD portion of the signal may then be constrained according to one or more tolerance parameters or thresholds. Other embodiments may be described and/or claimed.

21 Claims, 9 Drawing Sheets

SYMBOL CONSTELLATION DESIGN

FIELD

Embodiments of the present invention relate generally to the technical field of variable guard intervals in wireless networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

In some wireless networks such as long term evolution (LTE) networks as defined by various third generation partnership project (3GPP) technical specifications (TSs), a variable guard interval (GI), also known as a variable-length GI, may be used as part of a transmission of an orthogonal frequency division multiplexing (OFDM) or orthogonal frequency division multiple access (OFDMA) signal (collectively referred to as "OFDM(A) signals" or "OFDM(A) transmit signals"). Specifically, a radio frame in which an OFDM(A) signal is transmitted may include the data payload of the OFDM(A) signal, and the frame may further include a GI between concurrent signals. As used herein, the term "OFDM(A) signal" will be used to refer to the combination of the data payload of the OFDM(A) signal and the GI. In embodiments, the OFDM(A) signal in the frequency domain (FD) may be comprised of a number of OFDM symbols or OFDMA subsymbols (collectively referred to herein as "OFDM(A) symbols") across a given frequency bandwidth.

In general, the frequency-domain (FD) input signal that may be used to generate the OFDM(A) signal may include data such as a payload data and/or quasi-random reference signals. The FD input signal may occupy a majority of the subcarriers of the radio frame used to transmit the OFDM(A) signal. After an inverse discrete fourier transform is applied to the FD input signal, the resultant time-domain (TD) signal may not include a GI, or may include a GI with a length that is different than the intended length of the GI of the OFDM(A) signal.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In embodiments, apparatuses, methods, and storage media may be described for removing, from an FD portion of a signal, a guard interval portion. One or more data symbols of the resultant unconstrained FD portion of the signal may then be constrained according to one or more tolerance parameters or thresholds. In some embodiments, the guard interval portion may be based on application of a guard interval filter to a TD portion of the signal to identify a GI residual. The GI residual may then be converted to the FD and removed from the FD portion of the signal.

In some embodiments, the GI may have a variable length $L_i$ and content $GW_i$ where i indicates a given index such as a user-specific or link-specific index. In some embodiments, the length of the GI used may vary between users or radio links. The use of a variable GI may enable the transmission system to better adapt to individual multipath power delay profiles or other link parameters.

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As discussed herein, the term "module" may be used to refer to one or more physical or logical components or elements of a system. In some embodiments a module may be a distinct circuit, while in other embodiments a module may include a plurality of circuits.

Figure 1:
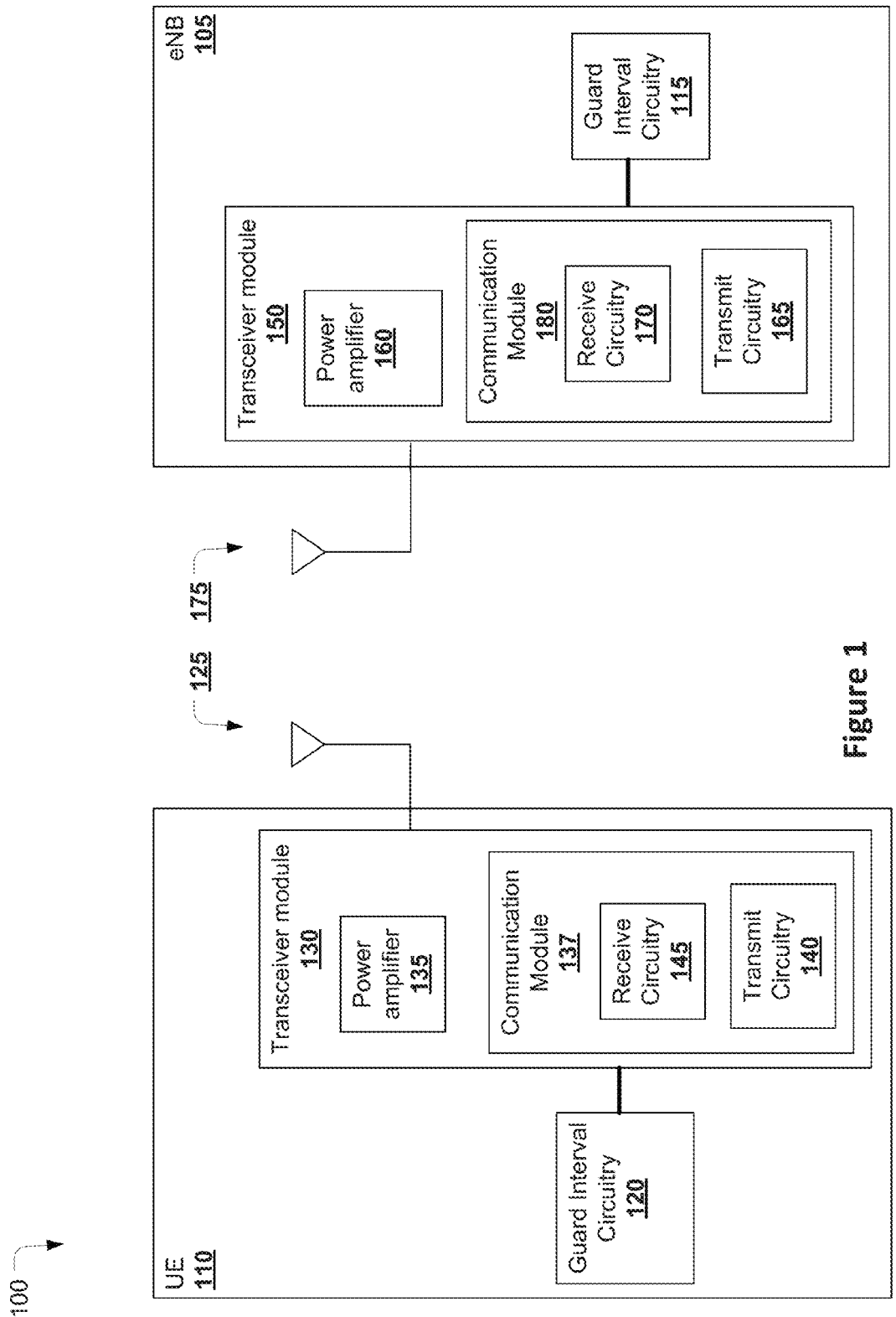
FIG. 1 schematically illustrates a high-level example of a network that includes a user equipment (UE) and an evolved NodeB (eNB), in accordance with various embodiments.

FIG. 1 schematically illustrates a wireless communication network 100 (hereinafter "network 100") in accordance with various embodiments. The network 100 may include a UE 110 that is communicatively coupled with an eNB 105. In embodiments, the network 100 may be a 3GPP LTE, LTE Advanced (LTE-A) and/or LTE-Unlicensed (LTE-U) network. In other embodiments, the network 100 may be some other type of wireless communication network.

As shown in FIG. 1, the UE 110 may include a transceiver module 130, which may also be referred to as a multi-mode transceiver chip. The transceiver module 130 may be configured to transmit and receive signals using one or more protocols such as LTE, LTE-A, and/or LTE-U protocols. Specifically, the transceiver module 130 may be coupled with one or more of a plurality of antennas 125 of the UE 110 for communicating wirelessly with other components of the network 100, e.g., eNB 105 or another UE. The antennas 125 may be powered by a power amplifier 135 which may be a component of the transceiver module 130 as shown in FIG. 1, or separate from but coupled with the transceiver module 130. In one embodiment, the power amplifier 135 may provide the power for all transmissions on the antennas 125. In other embodiments, there may be multiple power amplifiers on the UE 110. The use of multiple antennas 125 may allow for the UE 110 to use transmit diversity techniques such as spatial orthogonal resource transmit diversity (SORTD), multiple-input multiple-output (MIMO), or full-dimension MIMO (FD-MIMO).

In certain embodiments the transceiver module 130 may include a communication module 137, which may be referred to as a baseband module, which may contain both transmit circuitry 140 configured to cause the antennas 125 to transmit one or more signals from the UE 110, and receive circuitry 145 configured to process signals received by the antennas 125. In other embodiments, the communication module 137 may be implemented in separate chips or modules, for example, one chip including the receive circuitry 145 and another chip including the transmit circuitry 140. In some embodiments, the transmitted or received signals may be cellular signals transmitted to or received from eNB 105. In some embodiments, the transceiver module 130 may include or be coupled with guard interval circuitry 120. In embodiments, the guard interval circuitry 120 may be to identify a variable guard interval in OFDM(A) signals. In other embodiments, the guard interval circuitry 120 may be to measure one or more parameters of a communication between the UE 110 and the eNB 105 such as multi-path fading, and provide one or more recommendations or indications to the eNB 105 regarding a GI length to be used in further OFDM(A) signals between the UE 110 and eNB 105.

Similar to the UE 110, the eNB 105 may include a transceiver module 150. The transceiver module 150 may be further coupled with one or more of a plurality of antennas 175 of the eNB 105 for communicating wirelessly with other components of the network 100, e.g., UE 110. The antennas 175 may be powered by a power amplifier 160 which may be a component of the transceiver module 150, as shown in FIG. 1, or may be a separate component of the eNB 105. In one embodiment, the power amplifier 160 may provide the power for all transmissions on the antennas 175. In other embodiments, there may be multiple power amplifiers on or coupled to the eNB 105. The use of multiple antennas 175 may allow for the eNB 105 to use transmit diversity techniques such as SORTD, MIMO, or FD-MIMO. In certain embodiments the transceiver module 150 may contain both transmit circuitry 165 configured to cause the antennas 175 to transmit one or more signals from the eNB 105, and receive circuitry 170 to process signals received by the antennas 175. In embodiments, the transmit circuitry 165 and receive circuitry 170 may be elements of a communication module 180 of the transceiver module 150, as described above with respect to the UE 110. In other embodiments, the transceiver module 150 may be replaced by transmit circuitry 165 and receive circuitry 170 which are separate from one another or separate from the transceiver module 150 and/or communication module 180 (not shown). In some embodiments, the eNB 105 may include guard interval circuitry 115, which may be coupled with the transceiver module 150 or one or more elements of the transceiver module 150. The guard interval circuitry 115 may be to generate one or more OFDM(A) signals with a variable GI, as discussed in further detail below.

Figure 2:
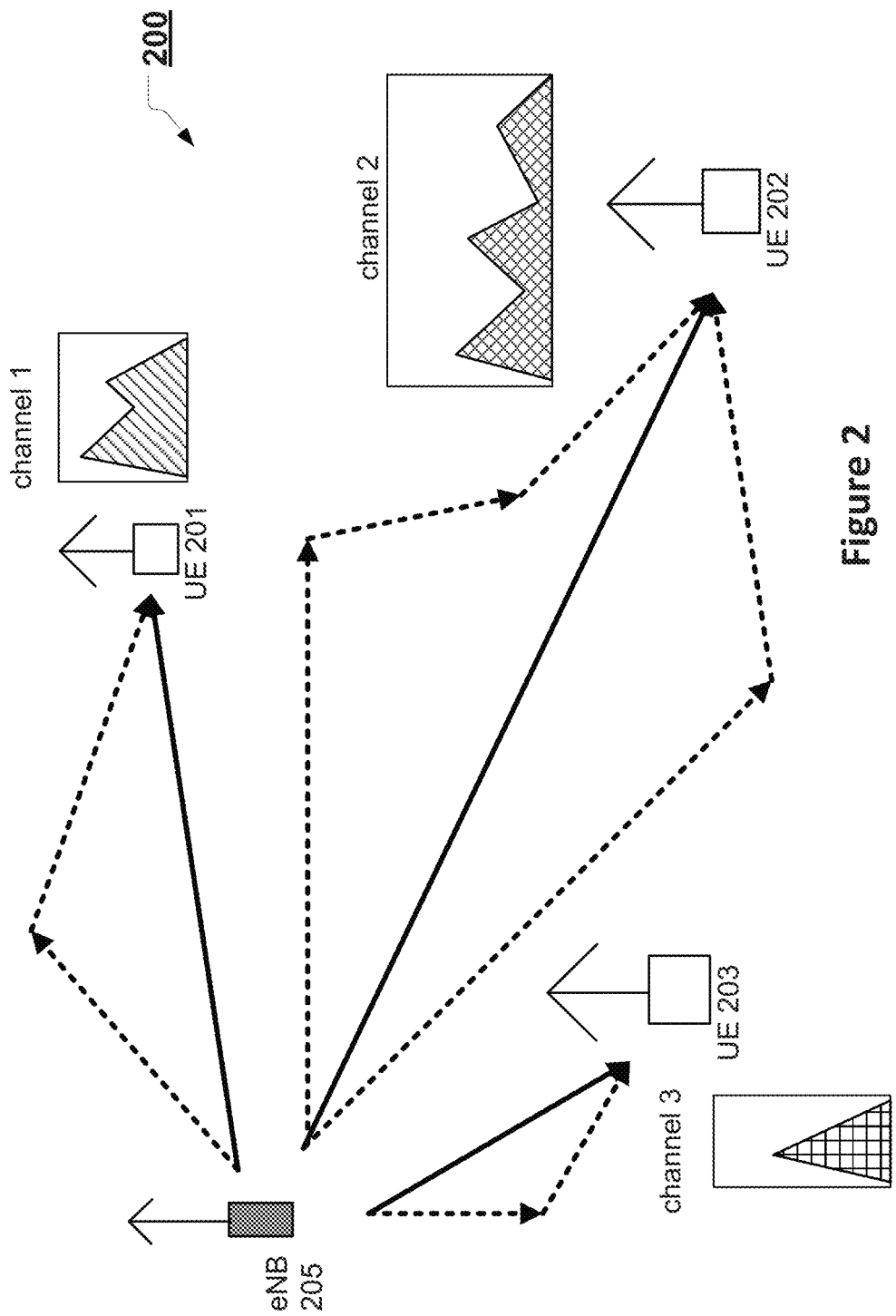
FIG. 2 illustrates a high-level example of multi-path fading in a network that includes an eNB and multiple UEs, in accordance with various embodiments.

FIG. 2 depicts a high-level example of multi-path fading in a network 200 that includes an eNB 205 and multiple UEs, in accordance with various embodiments. As shown, in some embodiments the eNB 205, which may be similar to eNB 105 of FIG. 1, may be configured to transmit (or receive) signals to (or from) one or more UEs such as UE 201, UE 202, and UE 203. UEs 201, 202, and 203 may be similar to UE 110 of FIG. 1. As indicated by the solid black lines, the eNB 205 may be configured to transmit a signal directly to one of the UEs 201, 202, or 203. In other embodiments, the signal from the eNB 205 may be reflected off one or more objects such as buildings, trees, etc., as indicated by the dashed black lines. In some embodiments, the signal may be reflected only once or multiple times. This reflection may cause fading, power delay, or interference, as shown by the example channel diagrams channel 1, channel 2, and channel 3, which correspond to UEs 201, 202, and 203, respectively. Therefore, it may be desirable for the eNB 205 to transmit an OFDM(A) signal using a frame format that includes the OFDM(A) signal and a variable GI to account for the multi-path effects. In some embodiments where the network 200 is relatively geographically small, or the UEs 201, 202, or 203 are relatively close to the eNB 205, the GIs of the OFDM(A) signals may be relatively short. However, if the UEs 201, 202, or 203 are relatively far from the eNB 205, then it may be desirable for the GI to be longer to account for the multi-path fading effects. In some embodiments, the GI used for an uplink (UL) transmission of a UE may be different than, or have a different length than, the GI used for the downlink (DL) transmission of the UE.

Figure 3:
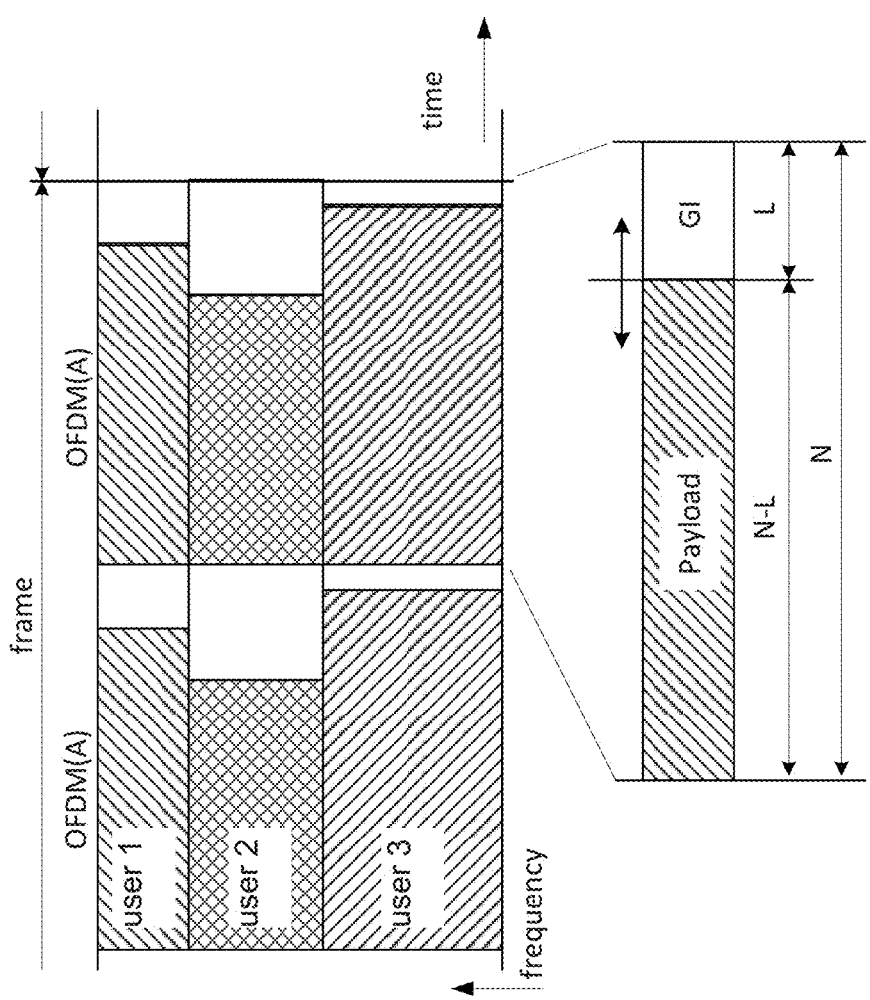
FIG. 3 illustrates OFDM(A) signal transmissions in frames that use variable GIs, in accordance with various embodiments.

FIG. 3 illustrates OFDM(A) signal transmissions in frames that use variable GIs. The OFDM(A) signal may include the data payload and the variable GI, as described above. Specifically, FIG. 3 may depict example OFDM(A) signals of network 200. As shown in FIG. 3, the radio frame may include two OFDM(A) signals per user, and transmissions for three users are depicted (though more or fewer users may be present in the network 200 in other embodiments). User 1 may correspond to the operator of UE 201, User 2 may correspond to the operator of UE 202, and User 3 may correspond to the operator of UE 203. As shown in FIG. 3, the OFDM(A) signal may have an overall length of N, and the GI may have a length of L. Therefore, the length of the data payload of a given OFDM(A) signal may be N-L.

In embodiments, N and L may be user or radio link dependent. As shown in FIG. 2, UE 202 may experience more significant multipath fading or power delay effects while UE 203 may experience less significant multipath fading or power delay effects. Therefore, the GI of the OFDM(A) signal of User 2 may be longer than, for example, the GI of User 3. However, it will be understood that the example GIs depicted in FIG. 3 are examples in accordance with one embodiment, and in other embodiments the GIs of the OFDM(A) signals associated with UEs 201, 202 and 203 may be configured differently.

Figure 4:
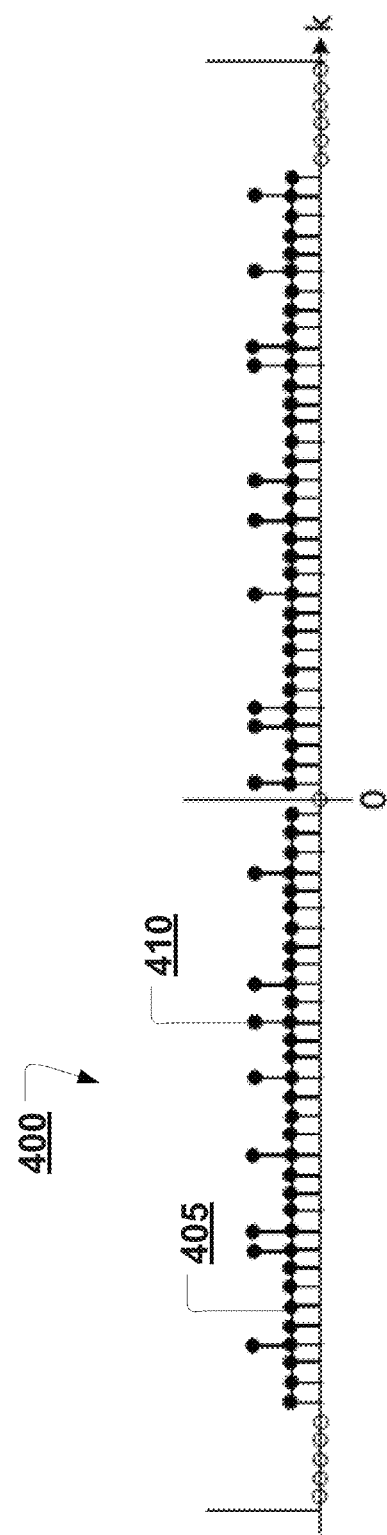
FIG. 4 illustrates an example of a symbol constellation design, in accordance with various embodiments.

In embodiments, the variable GI may be generated based on an FD symbol constellation design across the entire OFDM(A) symbol bandwidth. Specifically, the GI may be formed by cancelling the TD contributions of random payload symbols within the GI by adding an overlay signal to the input symbols themselves. The overlay signal may be designed in a way that preserves the information contained in the payload symbols. FIG. 4 illustrates an example of such a symbol constellation design 400. Specifically, the symbol constellation design 400 may include a number of overlay symbols 410 added to payload symbols 405 of an OFDM(A) signal.

The symbol constellation design 400 of FIG. 4 may be contrasted with legacy solutions wherein a number of redundant carriers are periodically interspersed throughout the frequency bandwidth of the OFDM(A) signals. One undesirable aspect of the legacy solution is that the redundant symbols may produce a GI, but may have a negative effect on transmission power or throughput. Specifically, in OFDM(A) signals where a cyclic prefix (CP) may be used to generate the redundant carriers, the redundant carriers may not be usable for transmission of the data payload.

Figure 5:
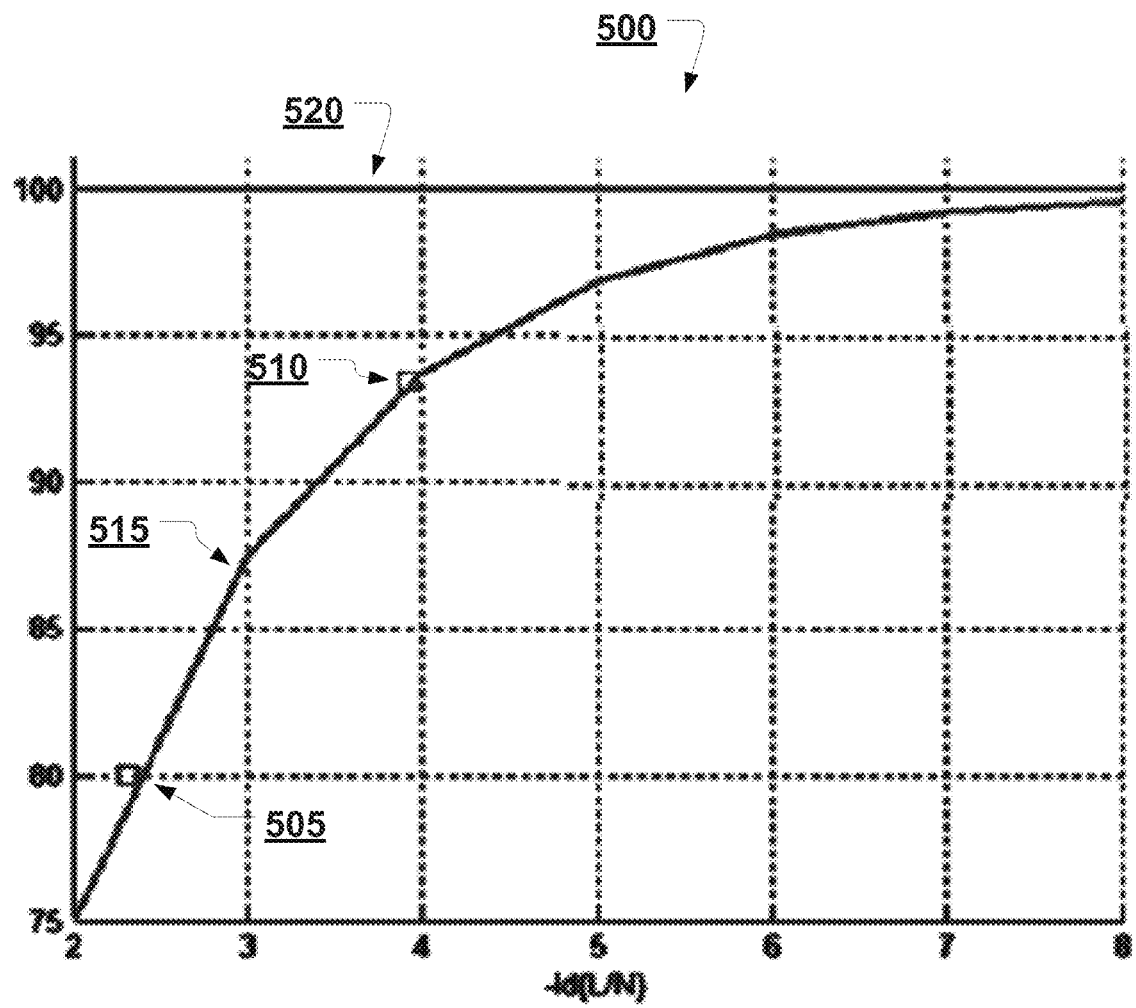
FIG. 5 illustrates an example of throughput when using a variable guard interval, in accordance with various embodiments.

FIG. 5 depicts an example of signal throughput for OFDM signals with different GI solutions. The y-axis depicts throughput as a percentage of maximum possible throughput. The x-axis depicts a ratio of guard interval length −ld(L/N). In the comparison 500, an LTE network that uses only redundant carriers with an extended CP (eCP) as depicted at 505 may have a relatively low throughput at a relatively low −ld(L/N) (or high L/N ratio), while a network that uses only redundant carriers with a normal CP (nCP) as depicted at 510 may have a higher throughput at a higher −ld(L/N) (or lower L/N ratio). Generally, the line 515 may depict increased throughput for networks that use a variable GI configuration based on legacy redundant carriers as −ld(L/N) increases (or L/N decreases). By contrast, embodiments of the present disclosure may experience a throughput that is close to 100% over a significant portion of the L/N ratio spectrum, as indicated by the approximately horizontal line 520.

Generally, in order to generate a symbol constellation design for an OFDM(A) signal such as the symbol constellation design 400 depicted in FIG. 4, two conflicting requirements may be resolved. Specifically, it may be desirable to create a GI of desired length $L_i$, while also preserving the information contained in the data payload of the OFDM(A) signal.

Requirement 1, the creation of the GI, may be expressed in terms of a TD GI filter $g_{TD}$. In embodiments, the TD GI filter $g_{TD}$ may be an approximately rectangular function. To put it another way, the TD GI filter $g_{TD}$ may be an impulse filter with a square or rectangular waveform and unit amplitude. In other embodiments, the TD GI filter $g_{TD}$ may not be strictly rectangular, but may have some other shape such as having a gradual increase or decrease, an exponential increase or decrease, a relatively steep increase or decrease, etc. over the time domain. The TD GI filter $g_{TD}$ may weight or multiply a given TD portion y of an OFDM(A) signal to generate a TD portion of the OFDM(A) signal that has the intended GI. The intended TD portion of the OFDM(A) signal, after GI formation, may be required to satisfy the following equations:

$$y = g_{TD} \circ y \quad (1a)$$

$$\tilde{g}_{TD} \circ y = 0 \quad (1b)$$

Where $\tilde{g}_{TD} = 1 - g_{TD}$ and the mathematical operator "∘" represents element-wise multiplication of two vectors. Equation 1a may be summarized as suggesting that further weighting of the TD portion y of the OFDM(A) signal by $g_{TD}$ may not alter the TD portion y any further. Similarly, equation 1b may be summarized as suggesting that weighting the TD portion y by $\tilde{g}_{TD}$ may yield zero output. A result of the above filters may be that the GI of the OFDM(A) signal, and particularly the TD portion y of the OFDM(A) signal, may be effectively muted or replaced by a zero value. In other embodiments, the GI of the TD portion y of the OFDM(A) signal may be replaced by a non-zero codeword that may be a mathematical result of the filters, or may be inserted into the GI of the TD portion y of the OFDM(A) signal after the GI portion is muted.

In FD, a corresponding FD GI filter vector $g_{FD}$ may exist that may be approximately equivalent in the FD to $g_{TD}$ in the TD. In other words, $g_{FD} \bullet - \circ g_{TD}$. The FD GI filter vector $g_{FD}$ may be a sinc function, e.g., a function that is similar to or mathematically based on a sine wave. The FD GI filter vector $g_{FD}$ may be used to filter or convolve an FD portion x of the OFDM(A) signal to generate the intended GI in the FD portion x. The intended FD portion x of the OFDM(A) signal, after GI formation, may be required to satisfy the following equations:

$$x = g_{FD} * x \quad (2a)$$

$$\tilde{g}_{FD} * x = 0 \quad (2b)$$

where $\tilde{g}_{FD} = [1\ 0\ \ldots\ 0] - g_{FD}$ and * represents convolution. Generally, convolution may be a mathematical operation that indicates the amount of overlap of one function a as it is shifted over another function b.

Similarly to equation 1a, equation 2a may be summarized as indicating that further FD GI filtering of the FD portion x by $g_{FD}$ may not alter the FD portion x any further. Equation 2b may indicate that further weighting of the FD portion x by $\tilde{g}_{FD}$ may yield zero output.

Figure 6:
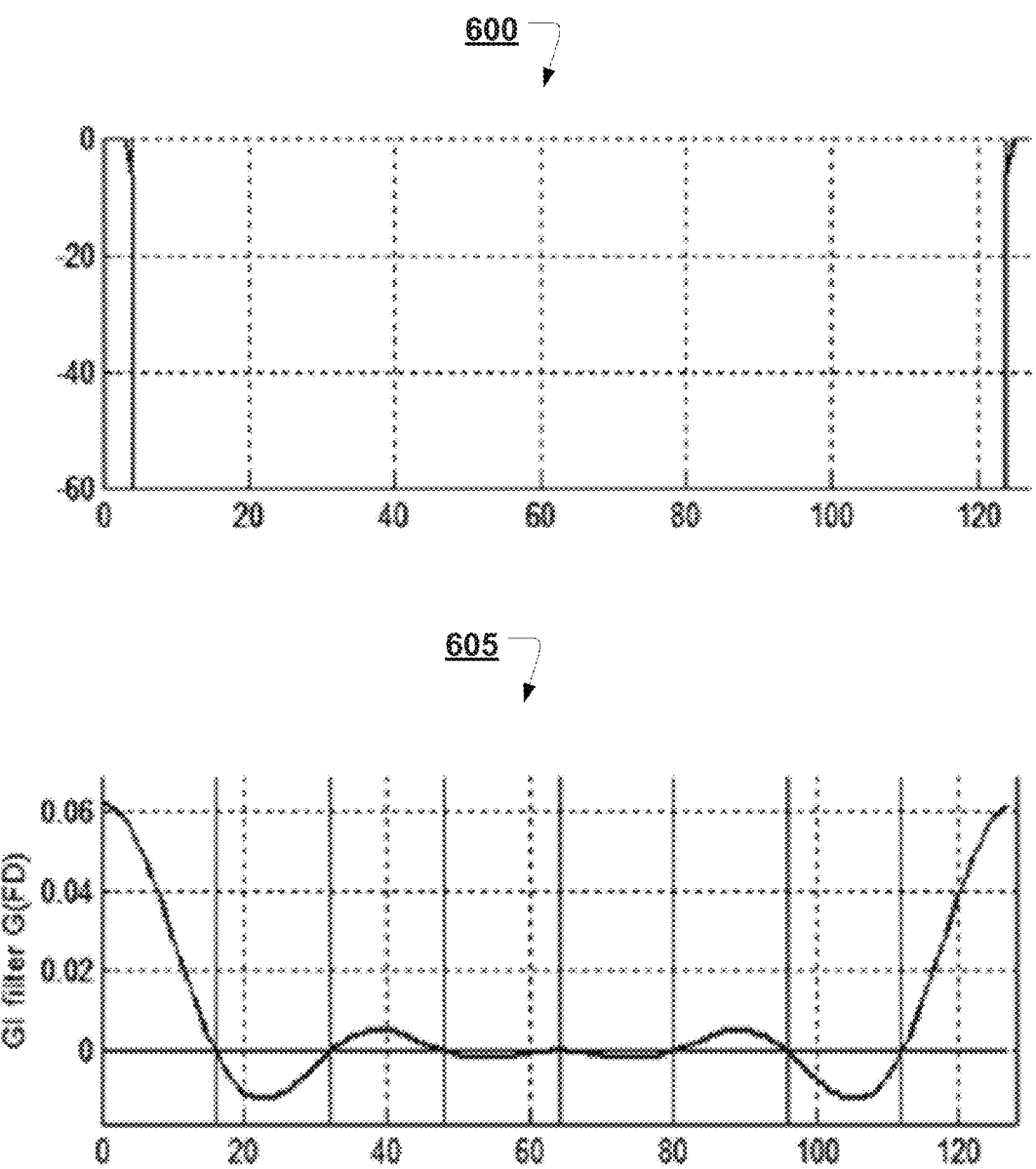
FIG. 6 illustrates example FD and TD GI functions, in accordance with various embodiments.

FIG. 6 depicts an example of GI filter functions $g_{TD}$ 600 and $g_{FD}$ 605. Generally, the GI TD filter $g_{TD}$ depicted at 600 may show the TD GI filter response (in decibels (dB)) versus the OFDM TD sample index. The passband region of the filter depicted at 600 may be rectangular or approximately rectangular. Specifically, in the GI TD filter $g_{TD}$ depicted at 600, the filter may be shown with x-axis values denoting a sample index over a fast fourier transform (FFT) size or inverse FFT (IFFT) size of 128 symbols. In other words, N, as depicted in FIG. 3, may be equal to 128. Similarly, the GI length L may be equal to 8. The y-axis may be represented in dB.

The GI FD filter $g_{FD}$ depicted at 605 may illustrate the corresponding FD GI filter $g_{FD}$ response with an x-axis similar to the x-axis described above of the GI filter function $g_{TD}$ at 600. The GI FD filter $g_{FD}$ may be considered to be sinc-shaped and be depicted on a linear scale. Specifically, the depiction of the GI FD filter $g_{FD}$ at 605 may show the TD GI filter response (in dB) versus the OFDM FD sample index or subcarrier index.

It will be understood that the example of the GI filters depicted in FIG. 6 are merely one example, and are depicted as being symmetric and real-valued. However, in other embodiments the filters may not be symmetric and/or may include imaginary values.

Requirement 2, preserving the information contained in the data payload of the OFDM(A) signal, may be satisfied in several ways. In one embodiment, tolerance regions for phase shift keying (PSK) or quadrature amplitude modulation (QAM) data symbol constellations may be defined. Specifically, the OFDM(A) signal may be modulated according to QAM, PSK, or some other modulation scheme. In these modulation schemes, symbols of the OFDM(A) signal may be represented on an I-Q grid, which may also be known as a constellation diagram. The constellation diagram may be a representation of the OFDM(A) signal modulated by the modulation scheme. It may display the signal as a two-dimensional scatter diagram in the complex plane at a given sampling instant. Specifically, the symbols may be represented as complex numbers where the x-axis may depict the real part of the complex number and be referred to as the "in phase" axis or "I-axis." By contrast, the y-axis may depict the imaginary part of the complex number and be referred to as the "quadrature" axis or "Q-axis." Generally, a symbol in the OFDM(A) signal may be represented by a given point on the I-axis and Q-axis of a constellation diagram. However, embodiments herein may allow for tolerance regions for the symbols to move in the I-Q grid while still preserving the data payload of the OFDM(A) signal.

Specifically, OFDM(A) symbols at the edges of the I-Q grid may be allowed to wander outward in the I-Q grid by some margin or tolerance, without negatively affecting the corresponding information bits. In some embodiments, corresponding demapped softbits or a log likelihood ratio (LLR) associated with the symbols may become stronger. In some embodiments, symbols such as QAM symbols in the center region of the I-Q grid may not be allowed to deviate from their nominal positions, or be allowed to only deviate from their positions to a small extent. In some embodiments, the amount of deviation of these center symbols may be based on an error vector magnitude (EVM) requirement or threshold related to the OFDM(A) signal. Similarly, in some embodiments pilot, reference, or virtual symbols may not be allowed to change at all.

It will be understood that the above described symbols or requirements are intended merely as examples, and in other embodiments different symbols may be allowed to deviate to a greater or lesser extent than those described above. Therefore, in some embodiments for a given data vector $x_d$ and a given FD overlay signal $x_r$, a composite FD portion of the OFDM(A) signal x may be defined as $x=x_d+x_r$. In embodiments, the FD portion of the OFDM(A) signal x may satisfy the following equations:

$$t_{min}(x_d) \leq x_r \leq t_{max}(x_d) \quad (3a)$$

$$x_{min} \leq x \leq x_{max} \quad (3b)$$

where $x_{min/max}=x_d+t_{min/max}(x_d)$. In embodiments, $t_{min/max}(x_d)$ and $x_{min/max}(x_d)$ may be the lower/upper tolerance limits on signals $x_r$ and x, respectively, for the data vector $x_d$.

Figure 7:
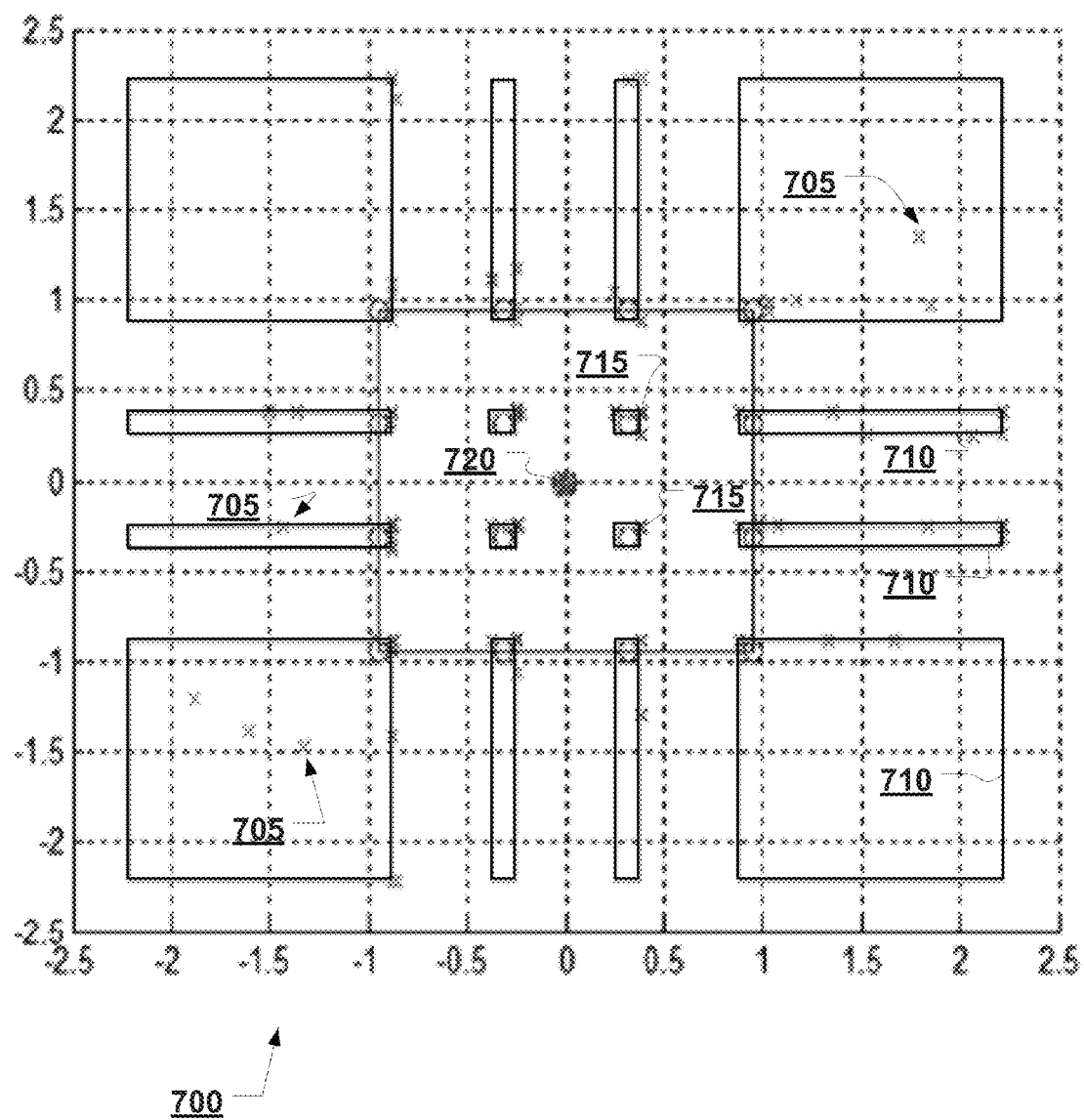
FIG. 7 illustrates example symbol tolerances, in accordance with various embodiments.

FIG. 7 illustrates example symbol tolerances, in accordance with various embodiments. Specifically, FIG. 7 depicts an example I-Q grid 700 for an OFDM(A) signal modulation according to a 16-QAM modulation scheme. The I-Q grid 700 may include a number of symbols 705. Overlaid on the I-Q grid 700 are a number of boxes 710 and 715 that indicate tolerances for a given symbol 705. It can be seen from FIG. 7 that boxes 710 that are closer to the edges of the I-Q grid 700 may be larger than the boxes 715 that are close to the center of the I-Q grid 700. As a result, symbols that are farther from the center of the I-Q grid 700 may be allowed a greater amount of tolerance or variance than symbols that are closer to the center of the I-Q grid 700, as described above. The specific size, number, or shape of the tolerances 710 and 715 are examples, and a different size, number, or shape may be used for a different I-Q grid 700 in another embodiment. Generally, it may be recognized that as a symbol 705 moves farther away from the center of the I-Q grid 700, that symbol may require more energy to transmit, so in some embodiments it may not be desirable to allow an I-Q grid 700 with very large tolerances because the resultant OFDM(A) signal may require a very large amount of energy to transmit.

As noted above, in some embodiments pilot or virtual symbols may only be allowed to move a small amount, or may not be allowed to move at all. The I-Q grid 700 depicts a virtual symbol at 720 that may be considered to be a superposition of symbols with value zero or approximately zero.

Figure 8:
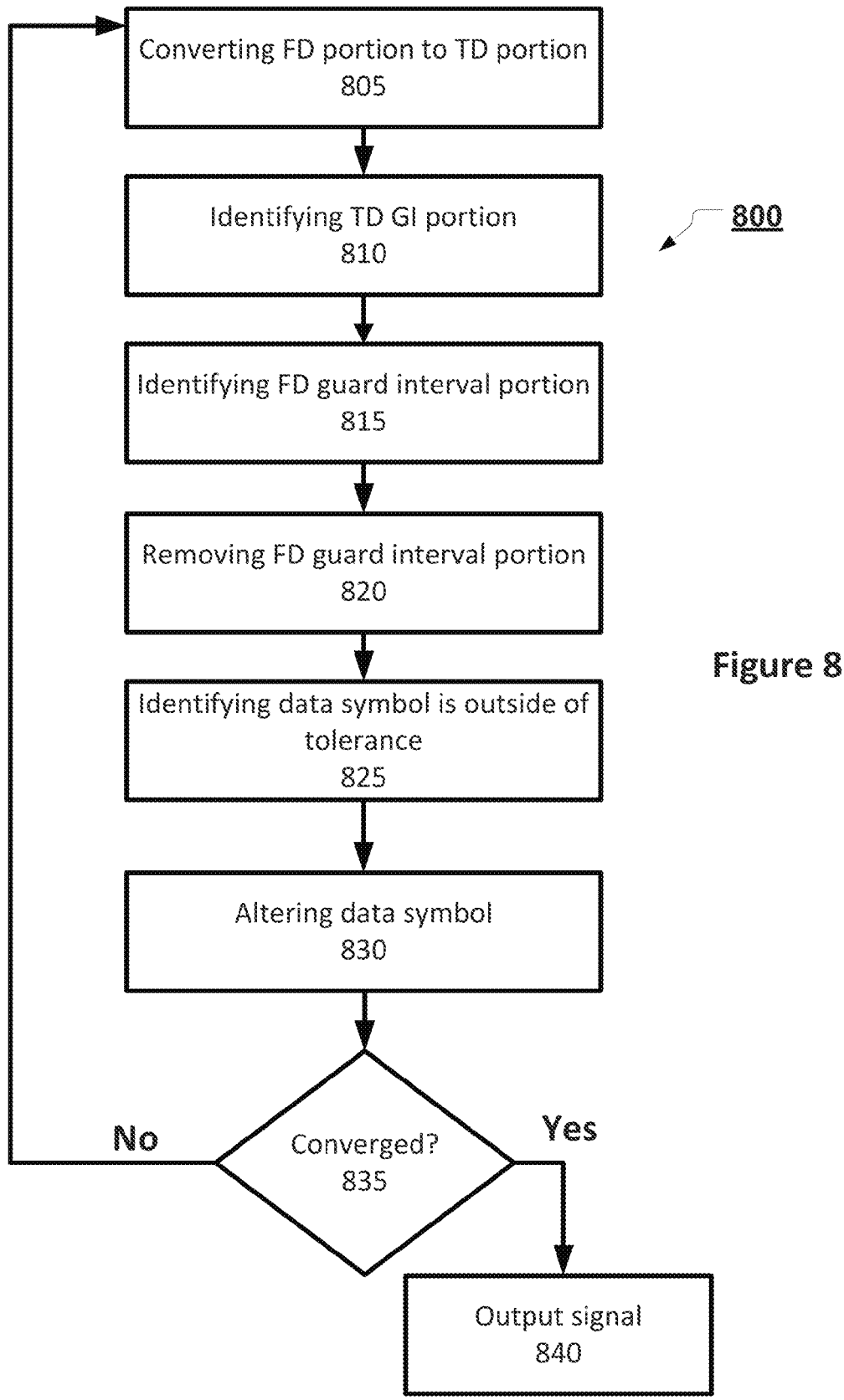
FIG. 8 illustrates an example process of variable GI signal generation, in accordance with various embodiments.

In general, design of the composite FD portion x of an OFDM(A) signal, which may be defined as $x=x_d+x_r$, may be based on observing the constraints depicted in equations 2a, 2b, 3a, and 3b simultaneously. In embodiments the signal generation may be performed iteratively or non-iteratively. FIG. 8 depicts an example of an iterative process 800 of generating the FD portion x of the OFDM(A) signal that may be performed by an electronic device. The process 800 may be performed, for example, by the GI circuitry 115 of the eNB 105. In other embodiments, the process 800 may be performed by the GI circuitry 120 of the UE 110, and then one or more indications or recommendations related to the GI may be transmitted from the UE 110 to the eNB 105. In other embodiments the process 800 may be performed by another OFDM(A) transmit signal/device such as a wireless local area network (WLAN) access point (AP), a WLAN user station (STA), or some other OFDM(A) transmit signal/device.

In embodiments, the process may begin with given data vector $x_d$, which may be an initial FD data vector of the FD portion x of the OFDM(A) signal. The data vector $x_d$ may be transformed into a TD portion y of the OFDM(A) signal at 805. For example, a transforming operation such as an inverse discrete fourier transform (IDFT) or some other transforming operation may be applied to the FD portion x of the OFDM(A) signal at 805 to yield a corresponding TD portion y of the OFDM(A) signal. The GI TD filter $g_{TD}$ may be applied to the TD portion y of the OFDM(A) signal, for example, through application of equation 1b, and the resultant TD GI portion $y_g$ may be identified at 810. The TD GI portion $y_g$ may be transformed, and the resultant FD GI portion $x_g$ may be identified at 815. For example, a transformative operation such as a discrete fourier transform (DFT) or some other operation may be applied to the TD GI portion $y_g$ to yield the FD GI portion $x_g$.

The FD GI portion $x_g$ may then be removed from the FD portion x of the OFDM(A) signal at 820 to generate an unconstrained FD portion of the OFDM(A) signal, $x_u$. Specifically, $x_u$ may be equal to $x-x_g$. $x_u$ may be significantly GI free, but symbols of $x_u$ may violate the I-Q tolerances described above with respect to FIG. 7. For example, one or more of the OFDM(A) symbols may be outside of one or more of the I-Q tolerances of the OFDM(A) signal. This data symbol may be identified at 825, and then the identified data symbol may be altered at 830 to be within the defined tolerance at 830 to generate a new FD portion x of the OFDM(A) signal, which may be referred to as a constrained FD portion of the OFDM(A) signal. Specifically, the data symbol may be moved from its current position to a new position that is within the defined tolerance. In some embodiments, the symbol may be moved to a new position within the tolerance that is linearly closest to the current position of the symbol. In other words, if the current position of the data symbol is to the right of a tolerance, then the data symbol may be moved left to a new position just inside the tolerance. In other embodiments, the symbol may be moved farther or according to different decision-making parameters.

After the OFDM(A) symbol(s) have been moved within appropriate tolerances on the I-Q grid 700, the process 800 may then include identifying whether convergence has been achieved at 835. The identification of whether convergence of the iterative algorithm has been achieved may be based on factors such as suppression of the unwanted signal energy $E_g$ inside the guard interval, i.e., the squared norm $E_{g,i} = \|y_{g,i}\|^2$ of the TD GI portion after iteration i. Convergence may be declared when the residual GI energy $E_{g,i}$ has fallen below a particular energy threshold $E_{g,thr}$. In some embodiments, $E_{g,thr}$ may be an energy suppression threshold on the order of 10 or 20 dB below the initial energy $E_{g,0}$ of the GI signal before the first iteration. If convergence has not been achieved, then the process 800 may iterate and the constrained FD portion of the OFDM(A) signal may be used as the input $x_D$. If convergence has been achieved, then the constrained FD portion and a corresponding constrained TD portion may be output at 840 and used to generate a constrained OFDM(A) signal that may be transmitted by a transmitter such as transmit circuitry 165.

In some embodiments, GI signal blanking may be applied to the output OFDM(A) signal. Specifically, GI signal blanking may refer to zeroing out or otherwise suppressing the signal in the GI, even if doing so may result in a violation of the conditions described above. For example, the GI signal blanking may result in one or more symbols of the OFDM(A) signal to be outside of a tolerance. That violation may occur at the expense of a small EVM enhancement. However, if that EVM enhancement is relatively small or otherwise tolerable, the expense of the EVM enhancement may be acceptable. In some embodiments, rather than blanking the GI or applying a filter to the TD portion y of the OFDM(A) signal, the GI of the TD portion y may be filled in with a particular non-zero guard word, as described above.

The variable GI OFDM(A) signal generation as discussed herein may be desirable for low modulation order and/or relatively small GI lengths. Specifically, it may be difficult to satisfy the tolerance limits described above for higher-order modulation such as 64-QAM. In some embodiments, the variable GI OFDM(A) signal generation may be desirable for lengths L/N such as ¼ . . . ⅛ (QPSK), ~1/16 (16-QAM), and ~1/32 (64-QAM). Although in some embodiments the variable GI OFDM(A) signals may target decreasing GI lengths to more efficiently make use of a given channel, the corresponding flexible frame format of the variable GI OFDM(A) signals may enable the GIs to become longer (in real time) by increasing the OFDM(A) symbol length N, thus relaxing the L/N requirement in constellation symbol design.

The process 800 described above may relate to the generation of a GI in an OFDM(A) signal, but in other embodiments, similar filters or processes may be used to expand or enhance an already present GI or GI codeword. For example, an eNB such as eNB 205 may recognize that a longer GI is necessary, and so may use the GI filter to change the length of an already-existing GI of the TD portion of the OFDM(A) signal.

Figure 9:
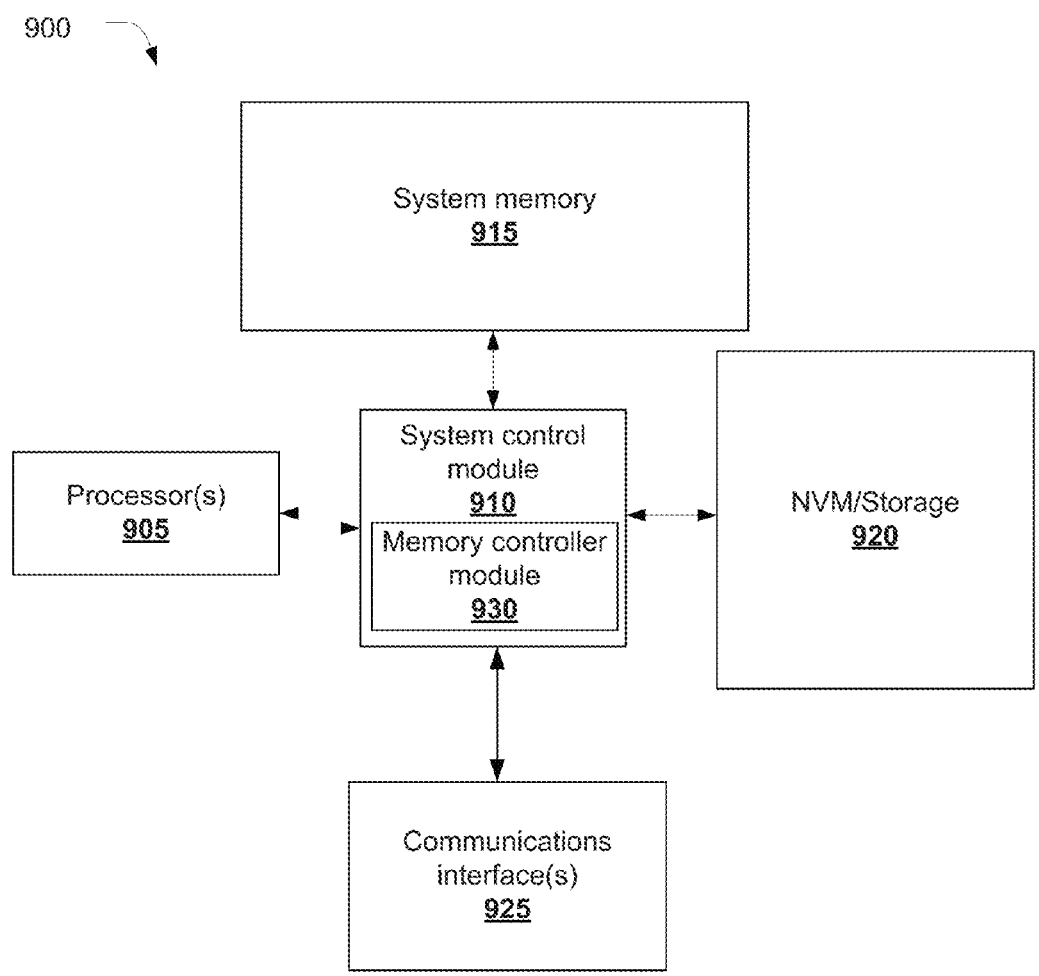
FIG. 9 schematically illustrates an example system that may be used to practice various embodiments described herein.

Embodiments of the present disclosure may be implemented into a system using any suitable hardware and/or software to configure as desired. FIG. 9 schematically illustrates an example system 900 that may be used to practice various embodiments described herein. FIG. 9 illustrates, for one embodiment, an example system 900 having one or more processor(s) 905, system control module 910 coupled to at least one of the processor(s) 905, system memory 915 coupled to system control module 910, non-volatile memory (NVM)/storage 920 coupled to system control module 910, and one or more communications interface(s) 925 coupled to system control module 910.

In some embodiments, the system 900 may be capable of functioning as the UEs 110, 201, 202, or 203 as described herein. In other embodiments, the system 900 may be capable of functioning as eNBs 105 or 205 as described herein. In some embodiments, the system 900 may include one or more computer-readable media (e.g., system memory 915 or NVM/storage 920) having instructions and one or more processors (e.g., processor(s) 905) coupled with the one or more computer-readable media and configured to execute the instructions to implement a module to perform actions described herein.

System control module 910 for one embodiment may include any suitable interface controllers to provide for any suitable interface to at least one of the processor(s) 905 and/or to any suitable device or component in communication with system control module 910.

System control module 910 may include memory controller module 930 to provide an interface to system memory 915. The memory controller module 930 may be a hardware module, a software module, and/or a firmware module.

System memory 915 may be used to load and store data and/or instructions, for example, for system 900. System memory 915 for one embodiment may include any suitable volatile memory, such as suitable dynamic random access memory (DRAM), for example. In some embodiments, the system memory 915 may include double data rate type four synchronous dynamic random-access memory (DDR4 SDRAM).

System control module 910 for one embodiment may include one or more input/output (I/O) controller(s) to provide an interface to NVM/storage 920 and communications interface(s) 925.

The NVM/storage 920 may be used to store data and/or instructions, for example. NVM/storage 920 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example.

The NVM/storage 920 may include a storage resource physically part of a device on which the system 900 may be installed or it may be accessible by, but not necessarily a part of, the device. For example, the NVM/storage 920 may be accessed over a network via the communications interface(s) 925.

Communications interface(s) 925 may provide an interface for system 900 to communicate over one or more network(s) and/or with any other suitable device. The system 900 may wirelessly communicate with the one or more components of the wireless network in accordance with any of one or more wireless network standards and/or protocols. In some embodiments the communications interface(s) 925 may include the transceiver modules 130 or 150.

For one embodiment, at least one of the processor(s) 905 may be packaged together with logic for one or more controller(s) of system control module 910, e.g., memory controller module 930. For one embodiment, at least one of the processor(s) 905 may be packaged together with logic for one or more controllers of system control module 910 to form a System in Package (SiP). For one embodiment, at least one of the processor(s) 905 may be integrated on the same die with logic for one or more controller(s) of system control module 910. For one embodiment, at least one of the processor(s) 905 may be integrated on the same die with logic for one or more controller(s) of system control module 910 to form a System on Chip (SoC).

In some embodiments the processor(s) 905 may include or otherwise be coupled with one or more of a graphics processor (GPU) (not shown), a digital signal processor (DSP) (not shown), wireless modem (not shown), digital camera or multimedia circuitry (not shown), sensor circuitry (not shown), display circuitry (not shown), and/or global positioning satellite (GPS) circuitry (not shown).

In various embodiments, the system 900 may be, but is not limited to, a server, a workstation, a desktop computing device, or a mobile computing device (e.g., a laptop computing device, a handheld computing device, a tablet, a netbook, a smartphone, a gaming console, etc.). In various embodiments, the system 900 may have more or fewer components, and/or different architectures. For example, in some embodiments, the system 900 includes one or more of a camera, a keyboard, liquid crystal display (LCD) screen (including touch screen displays), non-volatile memory port, multiple antennas, graphics chip, application-specific integrated circuit (ASIC), and speakers.

EXAMPLES

Example 1 may include an electronic device comprising: guard interval circuitry to: remove, from a first frequency domain (FD) portion of a first orthogonal frequency division multiplexing (OFDM) or orthogonal frequency division multiple access (OFDMA) transmit signal in a radio frame, an FD guard interval portion related to a guard interval of the radio frame; identify, after the removal of the FD guard interval portion, that a data symbol of a data symbol constellation related to the first OFDM or OFDMA signal is at a current position outside of a tolerance related to the data symbol constellation; alter, based on the identification, the data symbol to a new position that is inside of the tolerance to generate a second FD portion; and generate a second OFDMA or OFDMA transmit signal in the radio frame based on the guard interval and the second FD portion; and transmit circuitry to transmit the second OFDM or OFDMA transmit signal in the radio frame.

Example 2 may include the electronic device of example 1, wherein the electronic device is an evolved NodeB (eNB) or a user equipment (UE).

Example 3 may include the electronic device of example 1, wherein the guard interval circuitry is further to: identify, based on application of a time domain (TD) guard interval filter to a TD portion of the first OFDM or OFDMA transmit signal that corresponds to the FD portion of the first OFDM or OFDMA transmit signal, a TD guard interval portion related to the guard interval of the radio frame; and identify the FD guard interval portion based on the TD guard interval portion.

Example 4 may include the electronic device of example 3, wherein the guard interval filter is a rectangular filter with a length based on an intended length of the TD guard interval portion.

Example 5 may include the electronic device of example 4, wherein the intended length of the TD guard interval portion is based on a distance between the electronic device and another electronic device for which the second LTE signal is intended.

Example 6 may include the electronic device of any of examples 1-5, wherein the current position of the data symbol is a position on an I-Q plane, and the tolerance is an I-Q tolerance.

Example 7 may include the electronic device of any of examples 1-5, wherein the data symbol constellation is a quadrature phase shift keying (QPSK) data symbol constellation or a quadrature amplitude modulation (QAM) data symbol constellation.

Example 8 may include a method comprising: removing, by an evolved NodeB (eNB) in a long term evolution (LTE) network, from a first frequency domain (FD) portion of an LTE signal, an FD guard interval portion related to a guard interval of the LTE signal; identifying, by the eNB after the removing the FD guard interval portion, that a data symbol of a data symbol constellation related to the LTE signal is at a current position outside of a tolerance related to the data symbol constellation; and altering, by the eNB based on the identifying, the data symbol to a new position that is inside of the tolerance to generate a second FD portion of the LTE signal.

Example 9 may include the method of example 8, wherein the data symbol is an orthogonal frequency division multiplexing (OFDM) or an orthogonal frequency division multiple access (OFDMA) data symbol.

Example 10 may include the method of example 8, further comprising: identifying, by the eNB based on applying a time domain (TD) guard interval filter to a TD portion of the LTE signal that corresponds to the FD portion of the LTE signal, a TD guard interval portion related to the guard interval of the LTE signal; and identifying, by the eNB, the FD guard interval portion based on the TD guard interval portion.

Example 11 may include the method of example 10, wherein the guard interval filter is a rectangular filter with a length based on an intended length of the TD guard interval portion.

Example 12 may include the method of any of examples 8-11, wherein the FD guard interval is a first FD guard interval, the data symbol is a first data symbol, the current position is a first current position, the new position is a first new position, and wherein altering the data symbol generates a second FD portion of the LTE signal, the method further comprising: removing, by the eNB, a second FD guard interval portion from the second FD portion of the LTE signal; identifying, by the eNB after the removing the second FD guard interval portion, that a second data symbol of the data symbol constellation is at a second current position outside of the tolerance; and altering, by the eNB based on the identifying, the second data symbol to a second new position that is inside of the tolerance.

Example 13 may include the method of example 12, wherein the removing the second FD guard interval portion is based on determining, by the eNB, that convergence between the first FD portion and the second FD portion has not been achieved.

Example 14 may include the method of any of examples 8-11, wherein the current position of the data symbol is a position on an I-Q plane, and the tolerance is an I-Q tolerance.

Example 15 may include the method of any of examples 8-11, wherein the data symbol constellation is a quadrature phase shift keying (QPSK) data symbol constellation or a quadrature amplitude modulation (QAM) data symbol constellation.

Example 16 may include one or more non-transitory computer-readable media comprising instructions to cause an electronic device, upon execution of the instructions by one or more processors of the electronic device, to: remove, from a first frequency domain (FD) portion of an orthogonal frequency division multiplexing (OFDM) or orthogonal frequency division multiple access (OFDMA) signal, an FD guard interval portion related to a guard interval of the OFDM or OFDMA signal; identify, after the removing the FD guard interval portion, that a data symbol of a data symbol constellation related to the OFDM or OFDMA signal is at a current position outside of a tolerance related to the data symbol constellation; and alter, based on the identifying, the data symbol to a new position that is inside of the tolerance to generate a second FD portion of the OFDM or OFDMA signal.

Example 17 may include the one or more non-transitory computer-readable media of example 16, further comprising instructions to: identify, based on applying a time domain (TD) guard interval filter to a TD portion of the OFDM or OFDMA signal that corresponds to the FD portion of the OFDM or OFDMA signal, a TD guard interval portion related to the guard interval of the OFDM or OFDMA signal; and identify the FD guard interval portion based on the TD guard interval portion.

Example 18 may include the one or more non-transitory computer-readable media of example 17, wherein the guard interval filter is a rectangular filter with a length based on an intended length of the TD guard interval portion.

Example 19 may include the one or more non-transitory computer-readable media of any of examples 16-18, wherein the current position of the data symbol is a position on an I-Q plane, and the tolerance is an I-Q tolerance.

Example 20 may include the one or more non-transitory computer-readable of any of examples 16-18, wherein the data symbol constellation is a quadrature phase shift keying (QPSK) data symbol constellation or a quadrature amplitude modulation (QAM) data symbol constellation.

Example 21 may include the one or more non-transitory computer-readable media of any of examples 16-18, wherein the electronic device is an evolved NodeB (eNB) or a user equipment (UE).

Example 22 may include an evolved NodeB (eNB) in a long term evolution (LTE) network, the eNB comprising: means to remove, from a first frequency domain (FD) portion of an LTE signal, an FD guard interval portion related to a guard interval of the LTE signal; means to identify, after removal of the FD guard interval portion, that a data symbol of a data symbol constellation related to the LTE signal is at a current position outside of a tolerance related to the data symbol constellation; and means to alter, based on an identification that the data symbol is at a current position outside of the tolerance, the data symbol to a new position that is inside of the tolerance to generate a second FD portion of the LTE signal.

Example 23 may include the eNB of example 22, wherein the data symbol is an orthogonal frequency division multiplexing (OFDM) or an orthogonal frequency division multiple access (OFDMA) data symbol.

Example 24 may include the eNB of example 22, further comprising: means to identify, based on application of a time domain (TD) guard interval filter to a TD portion of the LTE signal that corresponds to the FD portion of the LTE signal, a TD guard interval portion related to the guard interval of the LTE signal; and means to identify the FD guard interval portion based on the TD guard interval portion.

Example 25 may include the eNB of example 24, wherein the guard interval filter is a rectangular filter with a length based on an intended length of the TD guard interval portion.

Example 26 may include the eNB of any of examples 22-25, wherein the FD guard interval is a first FD guard interval, the data symbol is a first data symbol, the current position is a first current position, the new position is a first new position, and wherein the means to alter the data symbol include means to generate a second FD portion of the LTE signal, the eNB further comprising: means to remove a second FD guard interval portion from the second FD portion of the LTE signal; means to identify, after removal of the second FD guard interval portion, that a second data symbol of the data symbol constellation is at a second current position outside of the tolerance; and means to alter, based on identification that the second data symbol is at the second current position, the second data symbol to a second new position that is inside of the tolerance.

Example 27 may include the eNB of any of examples 22-25, wherein the removal of the second FD guard interval portion is based on a determination that convergence between the first FD portion and the second FD portion has not been achieved.

Example 28 may include the eNB of any of examples 22-25, wherein the current position of the data symbol is a position on an I-Q plane, and the tolerance is an I-Q tolerance.

Example 29 may include the eNB of any of examples 22-25, wherein the data symbol constellation is a quadrature phase shift keying (QPSK) data symbol constellation or a quadrature amplitude modulation (QAM) data symbol constellation.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:
1. An electronic device comprising:
   guard interval circuitry to:
      remove, from a first frequency domain (FD) portion of a first orthogonal frequency division multiplexing (OFDM) or orthogonal frequency division multiple access (OFDMA) transmit signal in a radio frame, an FD guard interval portion related to a guard interval of the radio frame;
      identify, after the removal of the FD guard interval portion, that a data symbol of a data symbol con- stellation related to the first OFDM or OFDMA signal is at a current position outside of a tolerance related to the data symbol constellation;
alter, based on the identification, the data symbol of the data symbol constellation to a new position that is inside of the tolerance to generate a second FD portion; and
generate a second OFDM or OFDMA transmit signal in the radio frame based on the guard interval and the second FD portion; and
transmit circuitry to transmit the second OFDM or OFDMA transmit signal in the radio frame.

2. The electronic device of claim 1, wherein the electronic device is an evolved NodeB (eNB) or a user equipment (UE).

3. The electronic device of claim 1, wherein the guard interval circuitry is further to:
identify, based on application of a time domain (TD) guard interval filter to a TD portion of the first OFDM or OFDMA transmit signal that corresponds to the FD portion of the first OFDM or OFDMA transmit signal, a TD guard interval portion related to the guard interval of the radio frame; and
identify the FD guard interval portion based on the TD guard interval portion.

4. The electronic device of claim 3, wherein the TD guard interval filter is a rectangular filter with a length based on an intended length of the TD guard interval portion.

5. The electronic device of claim 4, wherein the intended length of the TD guard interval portion is based on a distance between the electronic device and another electronic device for which a second long term evolution (LTE) signal is intended.

6. The electronic device of claim 1, wherein the current position of the data symbol of the data symbol constellation is a position on an I-Q plane, and the tolerance is an I-Q tolerance.

7. The electronic device of claim 1, wherein the data symbol constellation is a quadrature phase shift keying (QPSK) data symbol constellation or a quadrature amplitude modulation (QAM) data symbol constellation.

8. A method comprising:
removing, by an evolved NodeB (eNB) in a long term evolution (LTE) network, from a first frequency domain (FD) portion of an LTE signal, an FD guard interval portion related to a guard interval of the LTE signal;
identifying, by the eNB after the removing the FD guard interval portion, that a data symbol of a data symbol constellation related to the LTE signal is at a current position outside of a tolerance related to the data symbol constellation; and
altering, by the eNB based on the identifying, the data symbol of the data symbol constellation to a new position that is inside of the tolerance to generate a second FD portion of the LTE signal.

9. The method of claim 8, wherein the data symbol of the data symbol constellation is an orthogonal frequency division multiplexing (OFDM) or an orthogonal frequency division multiple access (OFDMA) data symbol.

10. The method of claim 8, further comprising:
identifying, by the eNB based on applying a time domain (TD) guard interval filter to a TD portion of the LTE signal that corresponds to the FD portion of the LTE signal, a TD guard interval portion related to the guard interval of the LTE signal; and
identifying, by the eNB, the FD guard interval portion based on the TD guard interval portion.

11. The method of claim 10, wherein the TD guard interval filter is a rectangular filter with a length based on an intended length of the TD guard interval portion.

12. The method of claim 8, wherein the FD guard interval is a first FD guard interval, the data symbol of the data symbol constellation is a first data symbol, the current position is a first current position, the new position is a first new position, and wherein altering the data symbol of the data symbol constellation generates a second FD portion of the LTE signal, the method further comprising:
removing, by the eNB, a second FD guard interval portion from the second FD portion of the LTE signal;
identifying, by the eNB after the removing the second FD guard interval portion, that a second data symbol of the data symbol constellation is at a second current position outside of the tolerance; and
altering, by the eNB based on the identifying, the second data symbol to a second new position that is inside of the tolerance.

13. The method of claim 12, wherein the removing the second FD guard interval portion is based on determining, by the eNB, that convergence between the first FD portion and the second FD portion has not been achieved.

14. The method of claim 8, wherein the current position of the data symbol of the data symbol constellation is a position on an I-Q plane, and the tolerance is an I-Q tolerance.

15. The method of claim 8, wherein the data symbol constellation is a quadrature phase shift keying (QPSK) data symbol constellation or a quadrature amplitude modulation (QAM) data symbol constellation.

16. One or more non-transitory computer-readable media comprising instructions to cause an electronic device, upon execution of the instructions by one or more processors of the electronic device, to:
remove, from a first frequency domain (FD) portion of an orthogonal frequency division multiplexing (OFDM) or orthogonal frequency division multiple access (OFDMA) signal, an FD guard interval portion related to a guard interval of the OFDM or OFDMA signal;
identify, after the removing the FD guard interval portion, that a data symbol of a data symbol constellation related to the OFDM or OFDMA signal is at a current position outside of a tolerance related to the data symbol constellation; and
alter, based on the identifying, the data symbol of the data symbol constellation to a new position that is inside of the tolerance to generate a second FD portion of the OFDM or OFDMA signal.

17. The one or more non-transitory computer-readable media of claim 16, further comprising instructions to:
identify, based on applying a time domain (TD) guard interval filter to a TD portion of the OFDM or OFDMA signal that corresponds to the FD portion of the OFDM or OFDMA signal, a TD guard interval portion related to the guard interval of the OFDM or OFDMA signal; and
identify the FD guard interval portion based on the TD guard interval portion.

18. The one or more non-transitory computer-readable media of claim 17, wherein the TD guard interval filter is a rectangular filter with a length based on an intended length of the TD guard interval portion.

19. The one or more non-transitory computer-readable media of claim 16, wherein the current position of the data symbol of the data symbol constellation is a position on an I-Q plane, and the tolerance is an I-Q tolerance.

20. The one or more non-transitory computer-readable of claim 16, wherein the data symbol constellation is a quadrature phase shift keying (QPSK) data symbol constellation or a quadrature amplitude modulation (QAM) data symbol constellation.

21. The one or more non-transitory computer-readable media of claim 16, wherein the electronic device is an evolved NodeB (eNB) or a user equipment (UE).

* * * * *